US012677053B2

(12) United States Patent
Chou

(10) Patent No.: US 12,677,053 B2
(45) Date of Patent: Jul. 7, 2026

(54) CAMERA DEVICE HAVING REINFORCEMENT MEMBER DISPOSED ON CIRCUIT BOARD

(71) Applicant: Chicony Electronics Co., Ltd., New Taipei City (TW)

(72) Inventor: Sheng-Sung Chou, New Taipei City (TW)

(73) Assignee: CHICONY ELECTRONICS CO., LTD., New Taipei City (TW)

( * ) Notice: Subject to any disclaimer, the term of this patent is extended or adjusted under 35 U.S.C. 154(b) by 37 days.

(21) Appl. No.: 18/738,279

(22) Filed: Jun. 10, 2024

(65) Prior Publication Data

US 2025/0142193 A1 May 1, 2025

(30) Foreign Application Priority Data

Oct. 25, 2023 (TW) ................................. 112140934

(51) Int. Cl.
*H04N 23/54* (2023.01)
*H04N 23/55* (2023.01)

(52) U.S. Cl.
CPC ............. *H04N 23/54* (2023.01); *H04N 23/55* (2023.01)

(58) Field of Classification Search
CPC ............................... H04N 23/54; H04N 23/55
See application file for complete search history.

(56) References Cited

U.S. PATENT DOCUMENTS

| | | | |
|---|---|---|---|
| 12,081,849 B2 * | 9/2024 | Luan ...................... | H04N 23/57 |
| 2012/0018830 A1 * | 1/2012 | Lin ........................ | H10F 39/804 |
| | | | 257/E31.127 |
| 2020/0403017 A1 * | 12/2020 | Wang ...................... | H10F 77/50 |
| 2021/0167105 A1 * | 6/2021 | Wang .................... | H10F 39/011 |
| 2022/0232150 A1 * | 7/2022 | Song ..................... | H04N 23/55 |
| 2023/0284419 A1 * | 9/2023 | Pang ...................... | H04N 23/55 |
| | | | 361/704 |
| 2024/0073507 A1 * | 2/2024 | Huang ................... | H04N 23/57 |
| 2024/0089573 A1 * | 3/2024 | Li .......................... | H04N 23/55 |

FOREIGN PATENT DOCUMENTS

| | | |
|---|---|---|
| TW | 202202930 A | 1/2022 |
| TW | I811032 B | 8/2023 |

* cited by examiner

*Primary Examiner* — Padma Haliyur
(74) *Attorney, Agent, or Firm* — MUNCY, GEISSLER, OLDS & LOWE, P.C.

(57) ABSTRACT

A camera device includes a circuit board, a photosensitive element, and a reinforcement member. The circuit board has an assembling hole, a first surface, and a second surface opposite to the first surface. The assembling hole penetrates the first surface and the second surface and has an inner annular surface. A periphery of the assembling hole is formed as a surrounding portion including a first side wall, a second side wall, a third side wall, and a fourth side wall. The photosensitive element is in the assembling hole and has a front surface, a back surface, and an outer peripheral portion connected between the front surface and the back surface and fixed to the inner annular surface. The reinforcement member is disposed on the first surface and includes a first plate member fixed to the first side wall and a second plate member fixed to the second side wall.

11 Claims, 10 Drawing Sheets

CAMERA DEVICE HAVING REINFORCEMENT MEMBER DISPOSED ON CIRCUIT BOARD

CROSS-REFERENCE TO RELATED APPLICATION

This non-provisional application claims priority under 35 U.S.C. § 119 (a) to patent application No. 112140934 filed in Taiwan, R.O.C. on Oct. 25, 2023, the entire contents of which are hereby incorporated by reference.

BACKGROUND

Technical Field

The instant disclosure relates to an optical device, in particular, to a camera device.

Related Art

Along with developments of technology, camera devices are widely used in different fields, such as personal electronic products, automobiles, and medical sciences. For example, a camera device may be installed on a computer device (such as a notebook computer or a tablet computer) to support the functions of video recording, on-line meeting, facial recognition or the like.

SUMMARY

In general, a camera device known to the inventor includes a circuit board and a photosensitive element. To make the overall thickness of the camera device thinner, the photosensitive element is assembled in the hole of the circuit board. However, such configuration although reduces the overall thickness of the camera device, because of the configuration of the hole of the circuit board, the circuit board and the photosensitive element may be displaced or deformed upon an external force is applied to the circuit board and the photosensitive element, thereby affecting the quality of the image detected by the photosensitive element.

In view of this, in one embodiment, a camera device is provided. The camera device comprises a circuit board, a photosensitive element, and a reinforcement member. The circuit board has an assembling hole, a first surface, and a second surface opposite to the first surface. The assembling hole penetrates the first surface and the second surface, and the assembling hole has an inner annular surface. A periphery of the assembling hole is formed as a surrounding portion. The surrounding portion includes a first side wall, a second side wall, a third side wall, and a fourth side wall connected to one another. The first side wall and the second side wall are at opposite sides, and the third side wall and the fourth side wall are at opposite sides. The photosensitive element is in the assembling hole. The photosensitive element has a front surface, a back surface, and an outer peripheral portion. The outer peripheral portion is connected between the front surface and the back surface, and the outer peripheral portion is fixed to the inner annular surface of the assembling hole. The reinforcement member is disposed on the first surface. The reinforcement member comprises a first plate member and a second plate member, the first plate member is fixed to the first side wall, and the second plate member is fixed to the second side wall.

As above, according to the camera device of one or some embodiments of the instant disclosure, the reinforcement member is further disposed on the surrounding portion around the assembling hole, so that the structural strength of a region of the circuit board adjacent to the assembling hole can be enhanced. Therefore, upon an external force is applied to the circuit board and the photosensitive element, the photosensitive element can be prevented from being displaced and the circuit board can be prevented from being deformed or broken, so that the photosensitive element can provide proper image sensing quality.

BRIEF DESCRIPTION OF THE DRAWINGS

The disclosure will become more fully understood from the detailed description given herein below for illustration only, and thus not limitative of the disclosure, wherein.

DETAILED DESCRIPTION

It is noted that, in the embodiments, the terms "first", "second", and "third" are provided to describe different elements, and these elements are not thus limited by using these terms. In all the figures, identical symbols are used to denote identical or similar elements.

Figure 1:
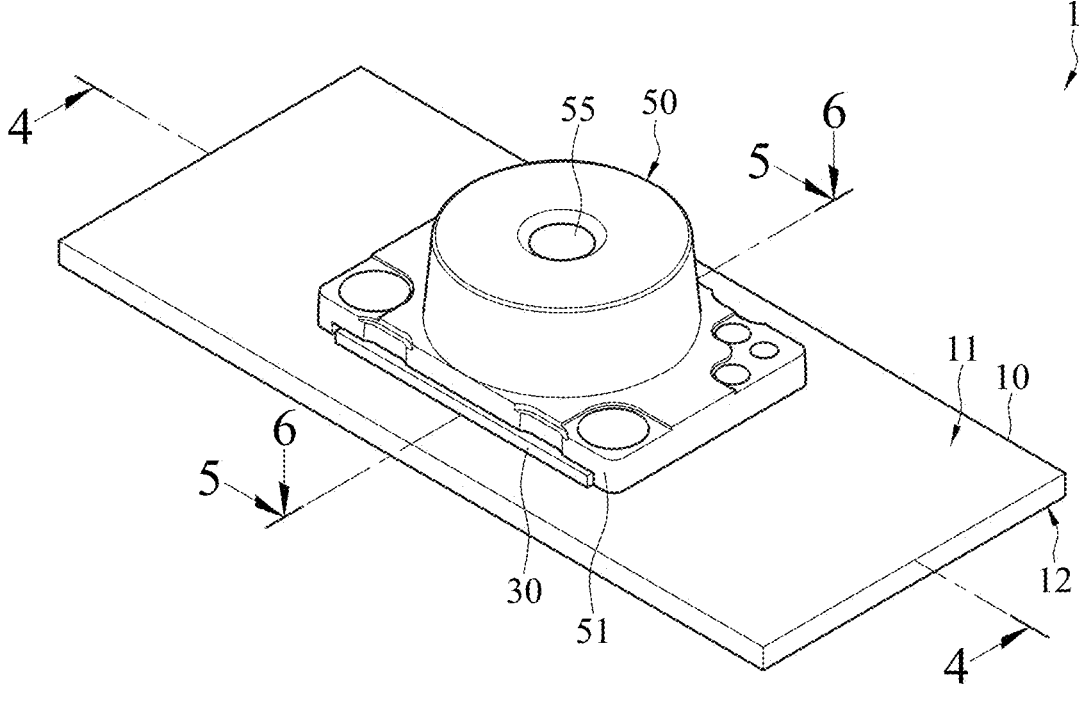
FIG. 1 illustrates a perspective view of a camera device according to a first embodiment of the instant disclosure.
Figure 2:
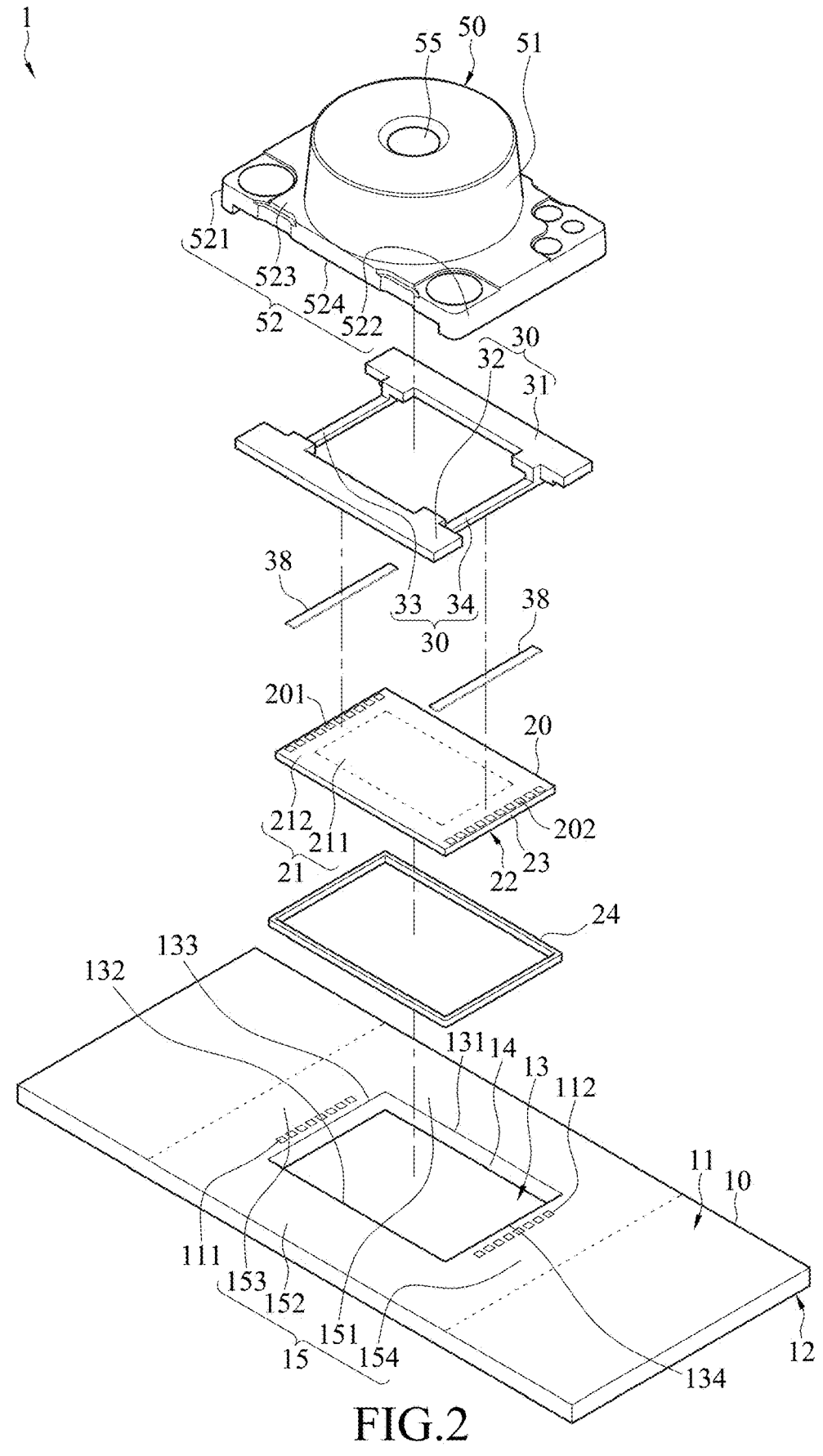
FIG. 2 illustrates an exploded view of the camera device of the first embodiment of the instant disclosure.
Figure 3:
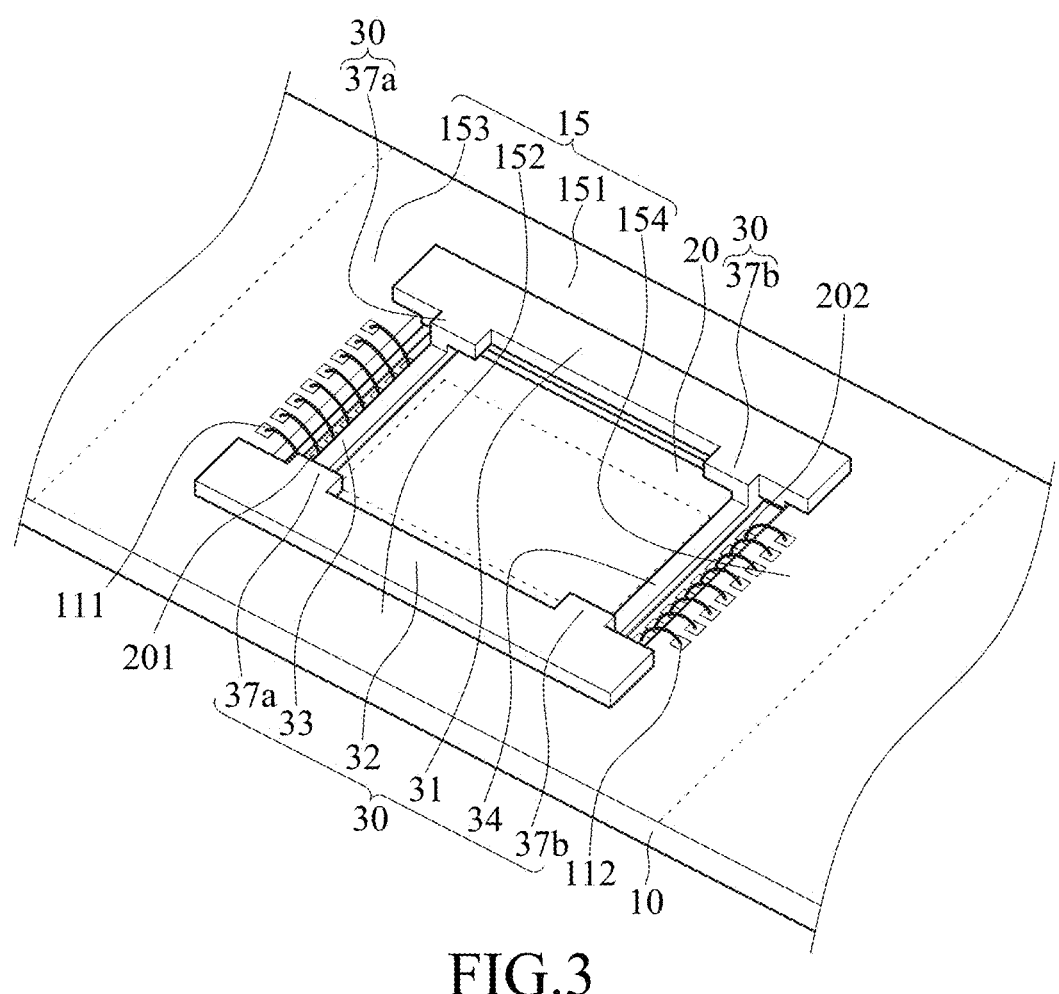
FIG. 3 illustrates an enlarged partial perspective view of the camera device of the first embodiment of the instant disclosure.
Figure 4:
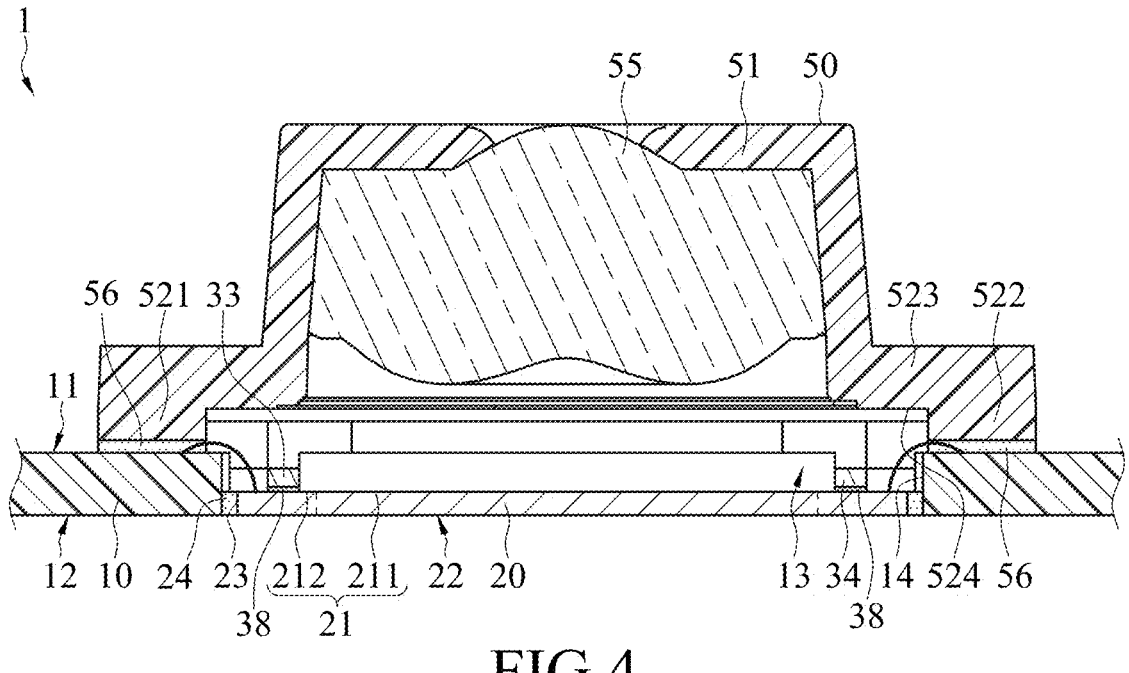
FIG. 4 illustrates a cross-sectional view along line 4-4 shown in FIG. 1.
Figure 5:
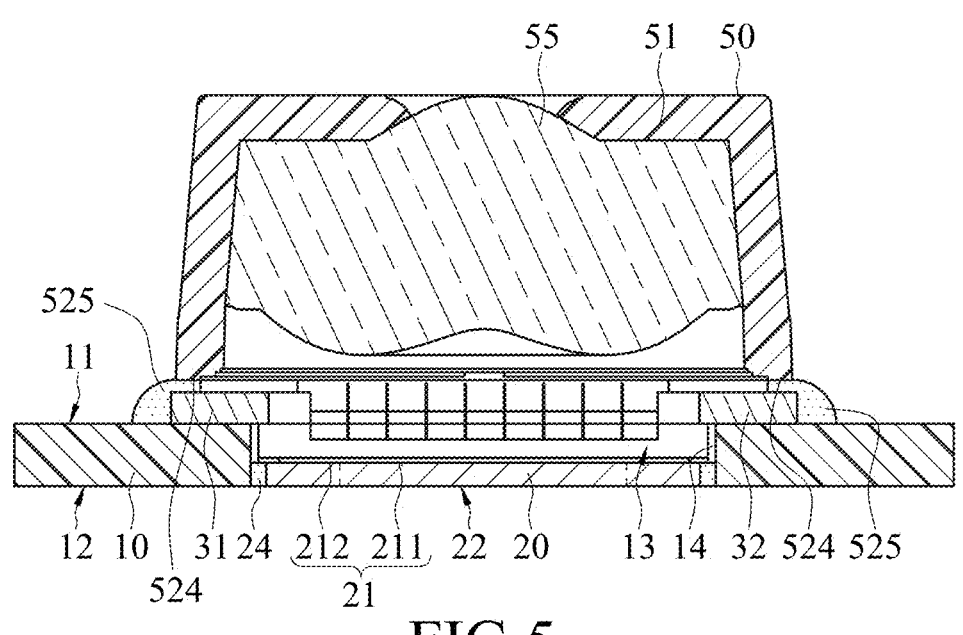
FIG. 5 illustrates a cross-sectional view along line 5-5 shown in FIG. 1.
Figure 6:
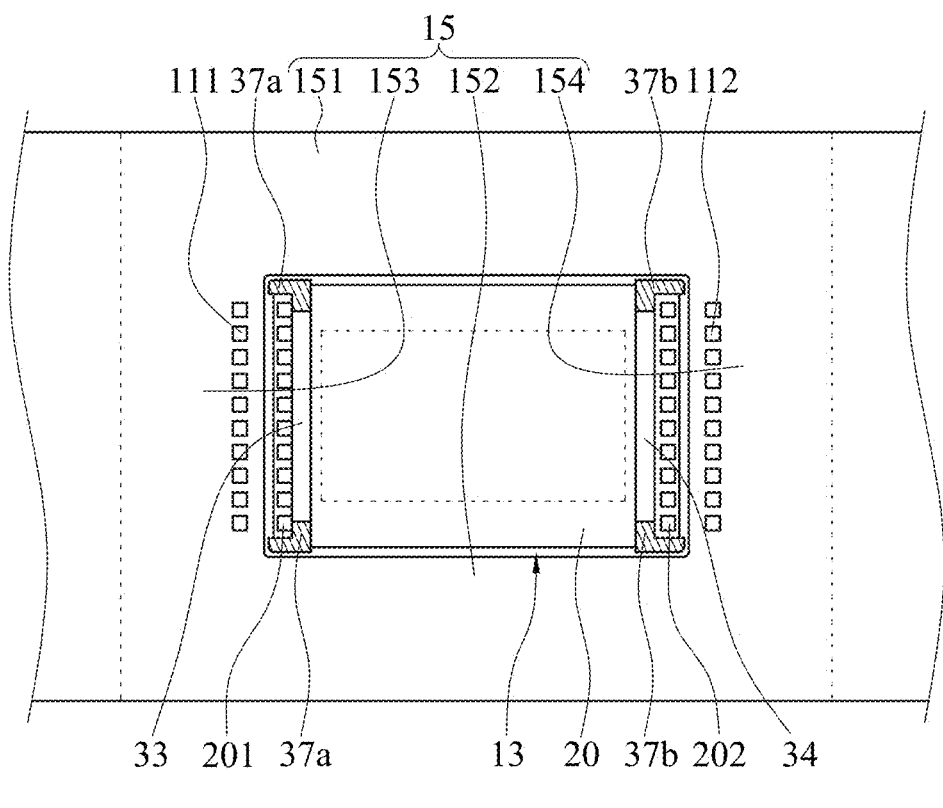
FIG. 6 illustrates a cross-sectional view along line 6-6 shown in FIG. 1.

FIG. 1 illustrates a perspective view of a camera device according to a first embodiment of the instant disclosure. FIG. 2 illustrates an exploded view of the camera device of the first embodiment of the instant disclosure. FIG. 3 illustrates an enlarged partial perspective view of the camera device of the first embodiment of the instant disclosure. FIG. 4 illustrates a cross-sectional view along line 4-4 shown in FIG. 1. FIG. 5 illustrates a cross-sectional view along line 5-5 shown in FIG. 1. FIG. 6 illustrates a cross-sectional view along line 6-6 shown in FIG. 1. As shown in FIG. 1 and FIG. 2, in this embodiment, the camera device 1 comprises a circuit board 10, a photosensitive element 20, and a reinforcement member 30. In some embodiments, the camera device 1 may be utilized in different electronic devices for capturing images around the electronic devices. For example, the camera device 1 may be utilized in mobile devices (e.g., smart phones, tablet computers, or notebook computers), cameras, or other electronic devices.

As shown in FIG. 2 to FIG. 6, the circuit board 10 has an assembling hole 13, a first surface 11, and a second surface 12 opposite to the first surface 11. The assembling hole 13 penetrates the first surface 11 and the second surface 12, the assembling hole 13 has an inner annular surface 14, and a periphery of the assembling hole 13 is formed as a surrounding portion 15. Specifically, in this embodiment, the surrounding portion 15 is the portion of the circuit board 10 surrounding the assembling hole 13. Moreover, in FIG. 2 and FIG. 3, a dashed line is provided to indicate the boundary of the surrounding portion 15; however, it should be noted that, the dashed line does not actually exist on the circuit board 10. Moreover, in this embodiment, the assembling hole 13 is a rectangular hole, but the instant disclosure is not limited thereto. In other embodiments, the assembling hole 13 may be a round hole, an elliptical hole, a square hole, or the like, depending on the actual product demands.

As shown in FIG. 2 to FIG. 6, the photosensitive element 20 is in the assembling hole 13. The photosensitive element 20 has a front surface 21, a back surface 22, and an outer peripheral portion 23. The outer peripheral portion 23 is connected between the front surface 21 and the back surface 22. The front surface 21 and the first surface 11 of the circuit board 10 face toward a same direction, and the back surface 22 and the second surface 12 of the circuit board 10 face toward a same direction. In some embodiments, the shape of the photosensitive element 20 may be rectangular (as shown in FIG. 2), round, elliptical, square, or other irregular shapes, and the instant disclosure is not limited thereto.

As shown in FIG. 2 to FIG. 6, the front surface 21 of the photosensitive element 20 has a photosensitive region 211 and a non-photosensitive region 212. The non-photosensitive region 212 is around the photosensitive region 211. In FIG. 2 to FIG. 6, for the sake of convenience and understanding, the front surface 21 of the photosensitive element 20 is divided into the photosensitive region 211 and the non-photosensitive region 212 through a dashed line. In some embodiments, the photosensitive element 20 may be made of semiconductor materials. The photosensitive region 211 may have tiny photosensitive units for detecting external lights so that the photosensitive region 211 can generate an image, while the non-photosensitive region 212 is a region which does not participate light detection and image generation. For example, the non-photosensitive region 212 may be electrically connected to the circuits on the circuit board 10 for signal transmission.

In some embodiments, specifically, the photosensitive element 20 may be a charge-coupled device (CCD), a complementary metal-oxide semiconductor (CMOS), or a CMOS active pixel sensor.

As shown in FIG. 2 to FIG. 6, the outer peripheral portion 23 of the photosensitive element 20 is fixed to the inner annular surface 14 of the assembling hole 13. For example, in this embodiment, the outer peripheral portion 23 of the photosensitive element 20 is adhesively fixed to the inner annular surface 14 through a first adhesive layer 24 which is of an annular shape. Therefore, during the manufacturing process of the camera device 1, the photosensitive element 20 can be disposed in the assembling hole 13 in advance, and the effects of the dusts, moisture, or other foreign matters in the ambient environment on the photosensitive element 20 can be reduced before the assembling hole 13 becomes an enclosed space. Moreover, because the photosensitive element 20 is not stacked on the surface of the circuit board 10, the overall thickness of the camera device 1 can be reduced.

Therefore, when the photosensitive element 20 is adhered to the inner annular surface 14 and the assembling hole 13 is covered by the lens assembly, the assembling hole 13 is thus become an enclosed space.

As shown in FIG. 2 to FIG. 6, the reinforcement member 30 is disposed on the first surface 11 and fixed to the surrounding portion 15, so that the structural strength of the portion of the circuit board 10 adjacent to the assembling hole 13 can be enhanced. Specifically, it is understood that, because of the configuration of the assembling hole 13, the surrounding portion 15 of the circuit board 10 adjacent to the assembling hole 13 is prone to be bent upon an external force is applied to the surrounding portion 15. Therefore, when the circuit board 10 and the photosensitive element 20 are subjected to an external force, the photosensitive element 20 is displaced and thus does not correspond to the focal length of the lens, or the surrounding portion 15 is deformed or broken. Consequently, according to one or some embodiments of the instant disclosure, through the configuration that the reinforcement member 30 is fixed to the surrounding portion 15, the structural strength of the surrounding portion 15 of the circuit board 10 can be enhanced and the robustness of the combination between the photosensitive element 20 and the circuit board 10 can be also enhanced, thereby increasing the overall structural strength of the camera device 1. Therefore, upon an external force is applied to the circuit board 10 and the photosensitive element 20, the photosensitive element 20 can be prevented from being displaced and the circuit board 10 can be prevented from being deformed or broken, so that the photosensitive element 20 can provide proper image sensing quality.

In some embodiments, the structural strength of the reinforcement member 30 may be greater than the structural strength of the circuit board 10. For example, the material of the reinforcement member 30 may be different from the material of the circuit board 10, so that the tensile strength, the compressive strength, or the flexural strength of the reinforcement member 30 is greater than the tensile strength, the compressive strength, or the flexural strength of the circuit board 10. Alternatively, in some embodiments, the material density of the reinforcement member 30 may be greater than the material density of the circuit board 10. Therefore, as compared to the circuit board 10, the reinforcement member 30 can bear a greater pressure and thus is not prone to be broken, deformed, or damaged, thereby allowing the reinforcement member 30 to provide proper reinforcement effect. The reinforcement member 30 may have several embodiments which will be described with the aids of drawings.

As shown in FIG. 2 to FIG. 6, the surrounding portion 15 of the circuit board 10 adjacent to the assembling hole 13 comprises a first side wall 151, a second side wall 152, a third side wall 153, and a fourth side wall 154 which are connected to one another. The first side wall 151 and the second side wall 152 are at opposite sides, and the third side wall 153 and the fourth side wall 154 are at opposite sides. For example, in this embodiment, the first side wall 151, the second side wall 152, the third side wall 153, and the fourth side wall 154 are enclosed to form a rectangular frame structure. Moreover, the first side wall 151 is parallel to the second side wall 152, two ends of the first side wall 151 are integrally connected to one of two ends of the third side wall 153 and one of two ends of the fourth side wall 154, respectively, two ends of the second side wall 152 are integrally connected to the other end of the third side wall 153 and the other end of the fourth side wall 154, respectively, and the first side wall 151 is perpendicular to the third side wall 153 and the fourth side wall 154. The reinforcement member 30 comprises a first plate member 31 and a second plate member 32, the first plate member 31 is fixed to the first side wall 151, and the second plate member 32 is fixed to the second side wall 152. For example, the first plate member 31 and the second plate member 32 may be respectively assembled and fixed to the first side wall 151 and the second side wall 152 through adhering, engaging, or locking, where as a basic rule, if possible, the first plate member 31 and the second plate member 32 do not cover the photosensitive region 211 of the photosensitive element 20. For example, in some embodiments, the first plate member 31 and the second plate member 32 may merely cover parts of the non-photosensitive region 212 of the photosensitive element 20.

Further, as shown in FIG. 2 and FIG. 3, the non-photosensitive region 212 of the photosensitive element 20 has a first conductive portion 201 and a second conductive portion 202, and the first conductive portion 201 and the second conductive portion 202 are respectively adjacent to the third side wall 153 and the fourth side wall 154 of the surrounding portion 15. The first surface 11 of the circuit board 10 has a first electrical connection portion 111 and a second electrical connection portion 112, and the first electrical connection portion 111 and the second electrical connection portion 112 are respectively on the third side wall 153 and the fourth side wall 154. The first electrical connection portion 111 is adapted to be electrically connected to the first conductive portion 201, and the second electrical connection portion 112 is adapted to be electrically connected to the second conductive portion 202, so that signals can be transmitted between the photosensitive element 20 and the circuit board 10.

For example, as shown in FIG. 3, in this embodiment, each of the first conductive portion 201, the second conductive portion 202, the first electrical connection portion 111, and the second electrical connection portion 112 may comprise a plurality of conductive contacts, the conductive contacts of the first electrical connection portion 111 may be electrically connected to the conductive contacts of the first conductive portion 201 through conductive wires, and the conductive contacts of the second electrical connection portion 112 may be electrically connected to the conductive contacts of the second conductive portion 202 through conductive wires.

As shown in FIG. 2 and FIG. 3, according to one or some embodiments of the instant disclosure, the first plate member 31 is fixed to the first side wall 151 and the second plate member 32 is fixed to the second side wall 152, so that the surface of the third side wall 153 and the surface of the fourth side wall 154 can have spaces for configuring the first electrical connection portion 111 and the second electrical connection portion 112. Moreover, the reinforcement member 30 is not shielded between the first electrical connection portion 111 and the first conductive portion 201 and between the second electrical connection portion 112 and the second conductive portion 202, so that the space for configuring the conductive wires can be retained.

Moreover, two opposite ends of the first plate member 31 may respectively extend toward the third side wall 153 and the fourth side wall 154, and two opposite ends of the second plate member 32 may respectively extend toward the third side wall 153 and the fourth side wall 154, so that portions of the third side wall 153 and the fourth side wall 154 can have the structural-reinforcement effect. For example, as shown in FIG. 2 and FIG. 3, the periphery of the assembling hole 13 has a first edge 131, a second edge 132, a third edge 133, and a fourth edge 134 which are connected to one another. The first edge 131 is connected to the first side wall 151, the second edge 132 is connected to the second side wall 152, the third edge 133 is connected to the third side wall 153, and the fourth edge 134 is connected to the fourth side wall 154. Two opposite ends of the first plate member 31 respectively cover a portion of the third edge 133 and a portion of the fourth edge 134, so that the two ends of the first plate member 31 are respectively fixed to a surface of the portion of the third side wall 153 and a surface of the portion of the fourth side wall 154. Likewise, two opposite ends of the second plate member 32 respectively cover another portion of the third edge 133 and another portion of the fourth edge 134, so that the two ends of the second plate member 32 are respectively fixed to a surface of the another portion of the third side wall 153 and a surface of the another portion of the fourth side wall 154.

As shown in FIG. 2 to FIG. 6, in this embodiment, the reinforcement member 30 further comprises a first connection arm 33 and a second connection arm 34. The first connection arm 33 and the second connection arm 34 are connected between the first plate member 31 and the second plate member 32, and the first connection arm 33 and the second connection arm 34 are respectively adjacent to two opposite ends of the first plate member 31 and two opposite ends of the second plate member 32, so that the reinforcement member 30 is formed as an annular plate member. Moreover, as a basic rule, if possible, the first connection arm 33 and the second connection arm 34 do not shield the photosensitive region 211 of the photosensitive element 20. For example, in some embodiments, the first connection arm 33 and the second connection arm 34 may merely cover parts of the non-photosensitive region 212 of the photosensitive element 20. Therefore, the first plate member 31 and the second plate member 32 can be connected to each other through the first connection arm 33 and the second connection arm 34, so that the overall structural strength of the reinforcement member 30 can be further increased, and thus the circuit board 10 can be prevented from being deformed or broken upon an external force is applied to the circuit board 10. In some embodiments, the first plate member 31, the second plate member 32, the first connection arm 33, and the second connection arm 34 of the reinforcement member 30 may be integrally formed as a one-piece structure, thereby further increasing the overall structural strength of the reinforcement member 30.

As shown in FIG. 2 to FIG. 6, in this embodiment, the first connection arm 33 and the second connection arm 34 of the reinforcement member 30 are further disposed on the non-photosensitive region 212 of the photosensitive element 20. For example, the first connection arm 33 and the second connection arm 34 may be attached to the surface of the non-photosensitive region 212. In some embodiments, the first connection arm 33 and the second connection arm 34 may be adhesively fixed to the surface of the non-photosensitive region 212 through a second adhesive layer 38, so that the photosensitive element 20 is connected and fixed to the reinforcement member 30, thereby increasing the overall structural strength of the camera device 1. Therefore, the photosensitive element 20 can be prevented from being displaced or deformed upon an external force is applied to the photosensitive element 20. For example, when the photosensitive element 20 is subjected to a force directed towards the reinforcement member 30, the first connection arm 33 and the second connection arm 34 abut against the photosensitive element 20 through the second adhesive layer 38, and thus the photosensitive element 20 can be prevented from being displaced or deformed along a direction towards the reinforcement member 30, and the photosensitive element 20 can be prevented from detaching off the circuit board 10 due to the external force.

However, it is understood that, the foregoing embodiments are provided for illustrative purposes. In some embodiments, the first connection arm 33 and the second connection arm 34 may be not fixed to the photosensitive element 20 and may be spaced apart from the front surface 21 of the photosensitive element 20. Moreover, in some embodiments, the positions and the shapes of the first connection arm 33 and the second connection arm 34 may be adjusted according to actual product demands, as long as the first connection arm 33 and the second connection arm 34 do not shield the photosensitive region 211 of the photosensitive element 20.

As shown in FIG. 3, in this embodiment, the first conductive portion 201 is between the first connection arm 33 and the first electrical connection portion 111, and the second conductive portion 202 is between the second connection arm 34 and the second electrical connection portion 112. Therefore, the first connection arm 33 is not shielded between the first electrical connection portion 111 and the first conductive portion 201, and the second connection arm 34 is not shielded between the second electrical connection portion 112 and the second conductive portion 202, thereby facilitating the configuration of the conductive wires.

As shown in FIG. 2 to FIG. 6, a thickness of the photosensitive element 20 may be less than a thickness of the circuit board 10. For example, the thickness of the photosensitive element 20 may be one second or one third of the thickness of the circuit board 10, and the photosensitive element 20 is adjacent to the second surface 12. In this embodiment, the back surface 22 of the photosensitive element 20 and the second surface 12 of the circuit board 10 are at the same plane, and the front surface 21 of the photosensitive element 20 is inside the assembling hole 13 and thus between the first surface 11 and the second surface 12 of the circuit board 10. Moreover, in this embodiment, the reinforcement member 30 comprises a plurality of limiting blocks 37a, 37b (in this embodiment, four limiting blocks 37a, 37b). Because the thickness of the photosensitive element 20 is less than the thickness of the circuit board 10, the limiting blocks 37a, 37b can extend and enter the assembling hole 13 so as to be adjacent to four corners of the assembling hole 13, so that the reinforcement member 30 can be limited by the limiting blocks 37a, 37b. Therefore, during the assembling process, the reinforcement member 30 can be prevented from being deviated from the predetermined assembling position.

As shown in FIG. 2 to FIG. 6, in this embedment, two limiting blocks 37a of the four limiting blocks 37a, 37b are adjacent to the third side wall 153 of the surrounding portion 15, and the two limiting blocks 37b are adjacent to the fourth side wall 154 of the surrounding portion 15. The first connection arm 33 is integrally connected between two bottom portions of the two limiting blocks 37a, and the second connection arm 34 is integrally connected between two bottom portions of the two limiting blocks 37b, thereby increasing the overall structural strength of the reinforcement member 30.

As shown in FIG. 2 to FIG. 6, the camera device 1 comprises a lens assembly 50. The lens assembly 50 is disposed on the first surface 11 and covers the assembling hole 13. The lens assembly 50 comprises a base 51 and a lens 55. The lens 55 is disposed on the base 51, and the position of the lens 55 corresponds to the position of the photosensitive element 20. Therefore, after an external light enters the base 51 through the lens 55, the external light can be focused on the photosensitive element 20. In this embodiment, the base 51 has a bottom 52, and the bottom 52 comprises a cover plate 523, a first side plate 521, and a second side plate 522. The first side plate 521 and the second side plate 522 are respectively connected to two opposite sides of the cover plate 523, so that two notches 524 are formed between the first side plate 521 and the second side plate 522, and the first side plate 521 and the second side plate 522 are fixed to the first surface 11 of the circuit board 10. For example, the first side plate 521 and the second side plate 522 may be adhesively fixed to the first surface 11 of the circuit board 10 through a third adhesive layer 56 (as shown in FIG. 4).

As shown in FIG. 2 to FIG. 6, the first plate member 31 and the second plate member 32 of the reinforcement member 30 are respectively disposed in the two notches 524 of the bottom 52 of the base 51, where the shapes of the notches 524 respectively correspond to the shape of the first plate member 31 and the shape of the second plate member 32. In this embodiment, the first plate member 31 of the reinforcement member 30 is in one of the two notches 524 of the bottom 52, and the second plate member 32 of the reinforcement member 30 is in the other one of the two notches 524 of the bottom 52. Therefore, the external light can be prevented from entering the camera device 1 through the two notches 524 and thus affecting the photosensitive performance of the photosensitive element 20. Moreover, the space inside the base 51 occupied by the first plate member 31 and the second plate member 32 can be also reduced. Furthermore, through the U-shape configuration of the bottom 52 of the base 51, the overall width of the lens assembly 50 can be much narrower.

As shown in FIG. 2 to FIG. 5, in this embodiment, a light-shielding adhesive layer 525 is further filled in each of the notches 524 of the base 51. For example, the light-shielding adhesive layer 525 may be a black adhesive layer, a brown adhesive layer, or a dark brown adhesive layer so as to provide the light-blocking function. Furthermore, in some embodiments, the light-shielding adhesive layer 525 may be a waterproof light-shielding adhesive layer and thus has a waterproof function. For example, the light-shielding adhesive layer 525 is a dark-colored waterproof adhesive layer to prevent the external moisture from entering the camera device 1 to cause photosensitive element 20 to get wet. Moreover, as shown in FIG. 5, one of the light-shielding adhesive layers 525 may be adhered to the first plate member 31 of the reinforcement member 30 and the first surface 11 of the circuit board 10, and the other one of the light-shielding adhesive layers 525 may be adhered to the second plate member 32 of the reinforcement member 30 and the first surface 11 of the circuit board 10, so that the two light-shielding adhesive layer 525 not only can provide light-blocking function but also can provide fixation function for the reinforcement member 30. For example, during the assembling process of the base 51, the light-shielding adhesive layer 525 in liquid state is filled in the notches 524 of the base 51, so that the light-shielding adhesive layer 525 in liquid state gradually flows to the periphery of the first plate member 31, the periphery of the second plate member 32, and the first surface 11 of the circuit board 10. After the light-shielding adhesive layer 525 is cured, the base 51, the reinforcement member 30, and the circuit board 10 can be combined with each other through the light-shielding adhesive layer 525, and thus the light-shielding adhesive layer 525 is a medium for combining the base 51, the reinforcement member 30, and the circuit board 10.

Figure 7:
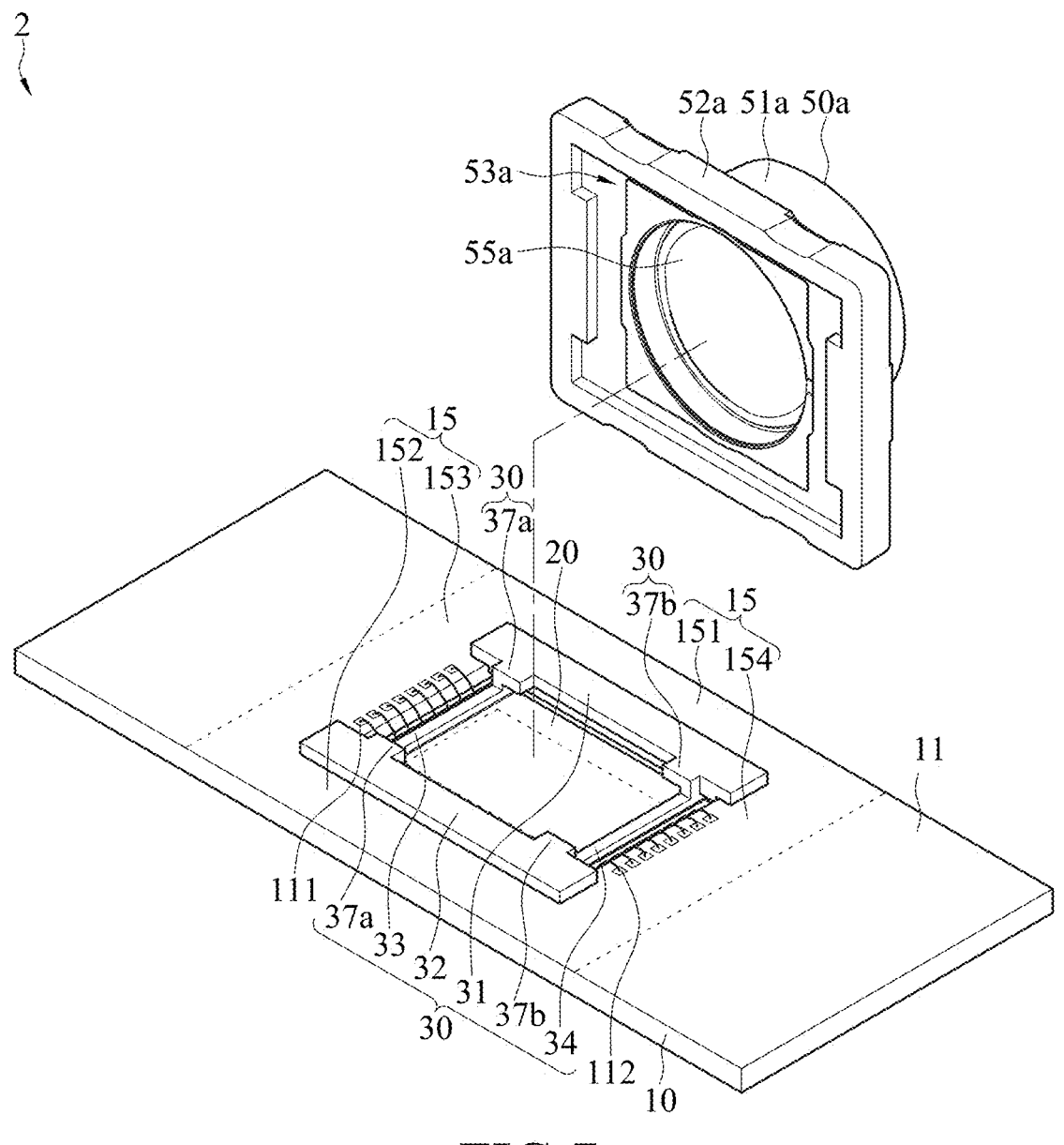
FIG. 7 illustrates an exploded view of a camera device according to a second embodiment of the instant disclosure.

FIG. 7 illustrates an exploded view of a camera device according to a second embodiment of the instant disclosure. As shown in FIG. 7, in this embodiment, the lens assembly 50a of the camera device 2 is also disposed on the first surface 11 of the circuit board 10 and covers the assembling hole 13. The lens assembly 50a comprises a base 51a and a lens 55a, the lens 55a is disposed on the base 51a, and the position of the lens 55a corresponds to the position of the photosensitive element 20. The difference between the second embodiment and the first embodiment is at least that, in this embodiment, the base 51a has an annular bottom 52a, the annular bottom 52a is enclosed to form an internal space 53a, the annular bottom 52a is fixed to the first surface 11 of the circuit board 10, and the reinforcement member 30 is entirely in the internal space 53a of the base 51a. Therefore, under such configuration, the light-shielding adhesive layer 525 can be omitted while the reinforcement member 30 still can be protected by the base 51a.

Figure 8:
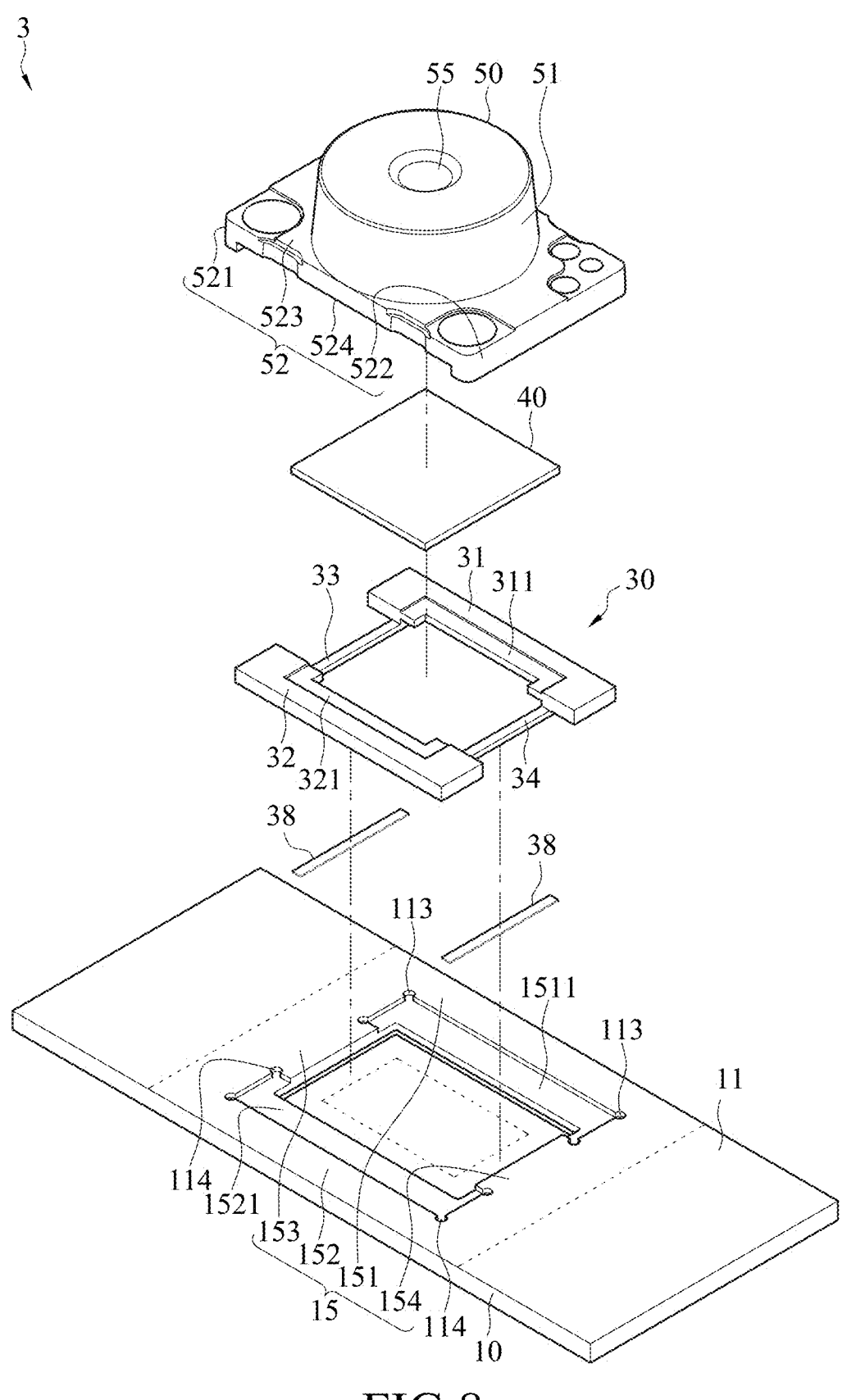
FIG. 8 illustrates an exploded view of a camera device according to a third embodiment of the instant disclosure.
Figure 9:
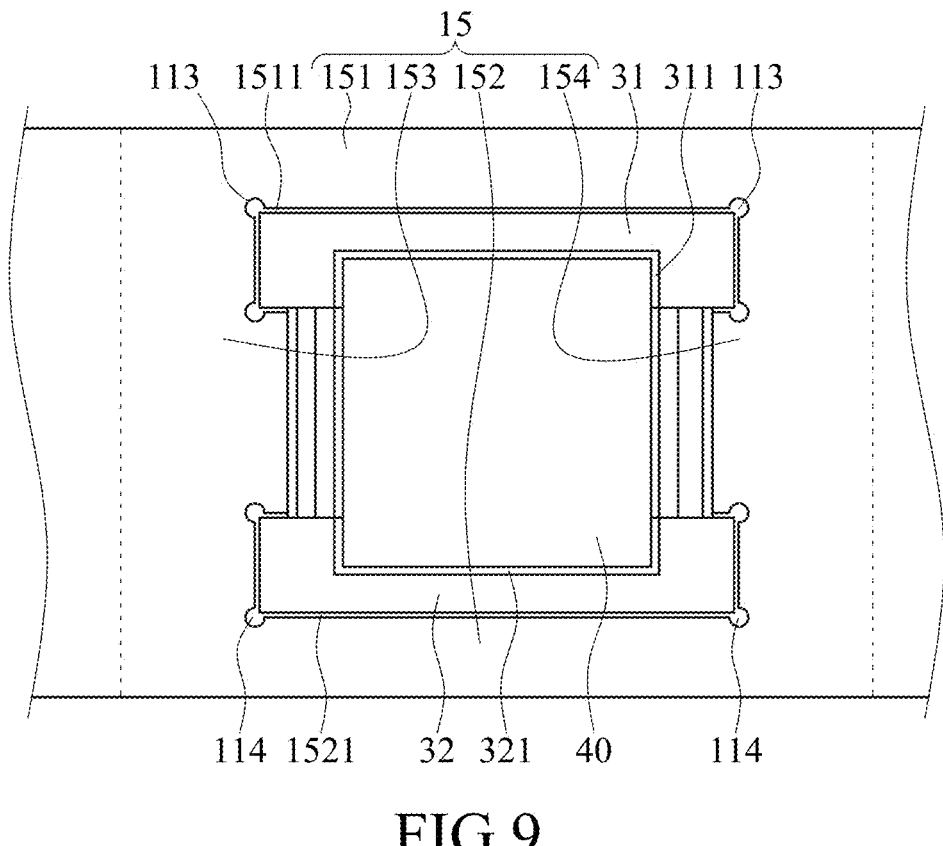
FIG. 9 illustrates a side view of the camera device of the third embodiment of the instant disclosure.

FIG. 8 illustrates an exploded view of a camera device according to a third embodiment of the instant disclosure. FIG. 9 illustrates a side view of the camera device of the third embodiment of the instant disclosure. As shown in FIG. 8 and FIG. 9, the difference between the third embodiment and the first embodiment is at least that, in this embodiment, the first side wall 151 of the surrounding portion 15 has a first limiting groove 1511, and the second side wall 152 of the surrounding portion 15 has a second limiting groove 1521. Moreover, the first plate member 31 of the reinforcement member 30 is limited in the first limiting groove 1511, and the second plate member 32 of the reinforcement member 30 is limited in the second limiting groove 1521. Therefore, through the configuration of the first limiting groove 1511 and the second limiting groove 1521, the assembling of the first plate member 31 and the second plate member 32 can be achieved conveniently. Moreover, after the first plate member 31 and the second plate member 32 are assembled on the circuit board 10, deviation of the first plate member 31 and the second plate member 32 can be prevented.

Moreover, as shown in FIG. 8 and FIG. 9, in this embodiment, the first surface 11 of the circuit board 10 further has at least one first adhesive guiding hole 113 and at least one second adhesive guiding hole 114 (in this embodiment, the number of the first adhesive guiding hole 113 is plural and the number of the second adhesive guiding hole 114 is also plural). The first adhesive guiding holes 113 are respectively at four corners of the first limiting groove 1511 and in communication with the first limiting groove 1511, and the second adhesive guiding holes 114 are respectively at four corners of the second limiting groove 1521 and in communication with the second limiting groove 1521.

Therefore, during the assembling of the first plate member 31 and the second plate member 32, the first adhesive guiding holes 113 and the second adhesive guiding hole 114 can be provided for guiding the flowing of the adhesive. For example, the adhesive may be injected from the first adhesive guiding hole 113 and the second adhesive guiding hole 114 and then flows into the first limiting groove 1511 and the second limiting groove 1521, so that after the first plate member 31 and the second plate member 32 are placed in the first limiting groove 1511 and the second limiting groove 1521, the first plate member 31 and the second plate member 32 can be adhesively fixed to the circuit board 10. Alternatively, in some embodiments, the adhesive may be applied on the bottom surfaces of the first plate member 31 and the second plate member 32 in advance, so that after the first plate member 31 and the second plate member 32 are placed in the first limiting groove 1511 and the second limiting groove 1521, the adhesive spilled from the first limiting groove 1511 and the second limiting groove 1521 can be guided to the first adhesive guiding hole 113 and the second adhesive guiding hole 114, and thus the adhesive can be prevented from flowing to the photosensitive element 20.

Moreover, as shown in FIG. 8 and FIG. 9, in this embodiment, the camera device 3 further comprises a filter 40. The filter 40 is between the lens 55 of the lens assembly 50 and the photosensitive element 20 and covers the photosensitive region 211 of the photosensitive element 20, and the filter 40 is adapted to filter or block a light having a certain wavelength range. In this embodiment, the first plate member 31 of the reinforcement member 30 has a first recess 311, the second plate member 32 of the reinforcement member 30 has a second recess 321, and two sides of the filter 40 are respectively limited in the first recess 311 and the second recess 312. Therefore, the reinforcement member 30 can also provide the function for positioning the filter 40. In some embodiments, the reinforcement member 30 of the camera device 3 may be devoid of the first recess 311 and the second recess 321, and the filter 40 is directly fixed on the surface of the first plate member 31 and the surface of the second plate member 32.

Figure 10:
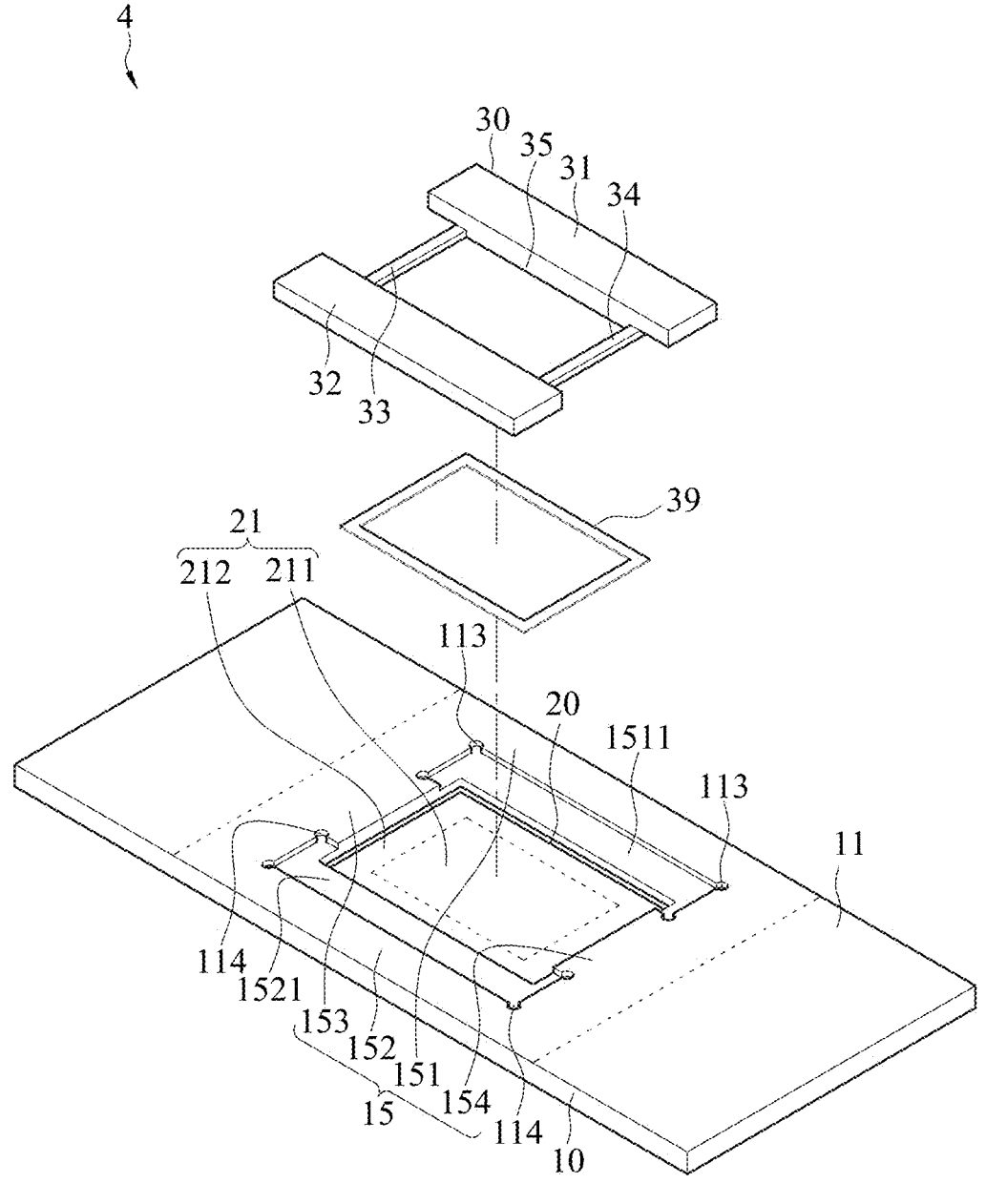
FIG. 10 illustrates an exploded view of a camera device according to a fourth embodiment of the instant disclosure.
Figure 11:
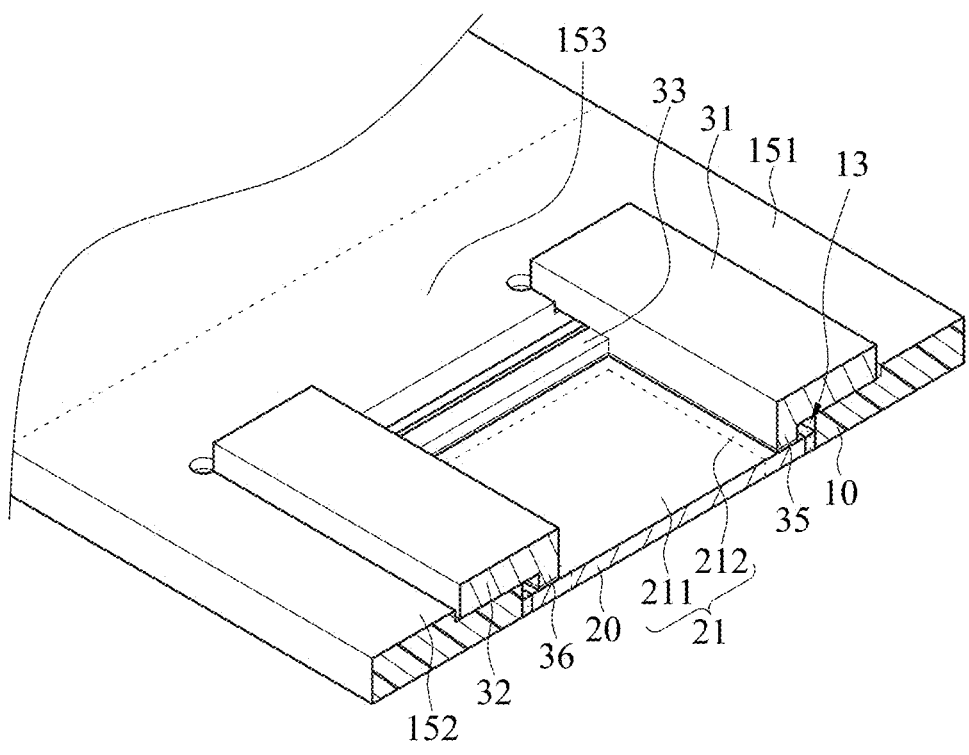
FIG. 11 illustrates a cross-sectional view of a camera device of the fourth embodiment of the instant disclosure.

FIG. 10 illustrates an exploded view of a camera device according to a fourth embodiment of the instant disclosure. FIG. 11 illustrates a cross-sectional view of a camera device of the fourth embodiment of the instant disclosure. As shown in FIG. 10 and FIG. 11, the difference between the fourth embodiment and the first embodiment is at least that, in this embodiment, the reinforcement member 30 of the camera device 4 further comprises a first extension portion 35 and a second extension portion 36. The first extension portion 35 integrally extends from the first plate member 31, and the first extension portion 35 extends toward the photosensitive element 20 and is in the assembling hole 13. Likewise, the second extension portion 36 integrally extends from the second plate member 32, and the second extension portion 36 extends toward the photosensitive element 20 and is in the assembling hole 13. Therefore, through the configuration of the first extension portion 35 and the second extension portion 36, the structural strength of the first plate member 31 and the second plate member 32 can be enhanced.

Further, as shown in FIG. 10 and FIG. 11, in this embodiment, the first extension portion 35 and the second extension portion 36 are blocks extending and connected between the first connection arm 33 and the second connection arm 34. Therefore, the first connection arm 33, the second connection arm 34, the first extension portion 35, and the second extension portion 36 are connected to one another to form an annular frame and fixed to the non-photosensitive region 212. Hence, the overall structural strength of the reinforcement member 30 can be further enhanced, and the assembled strength between the reinforcement member 30 and the photosensitive element 20 can be enhanced. In some embodiments, the first connection arm 33, the second connection arm 34, the first extension portion 35, and the second extension portion 36 can be adhesively fixed to the surface of the non-photosensitive region 212 of the photosensitive element 20 through an annular adhesive layer 39.

Figure 12:
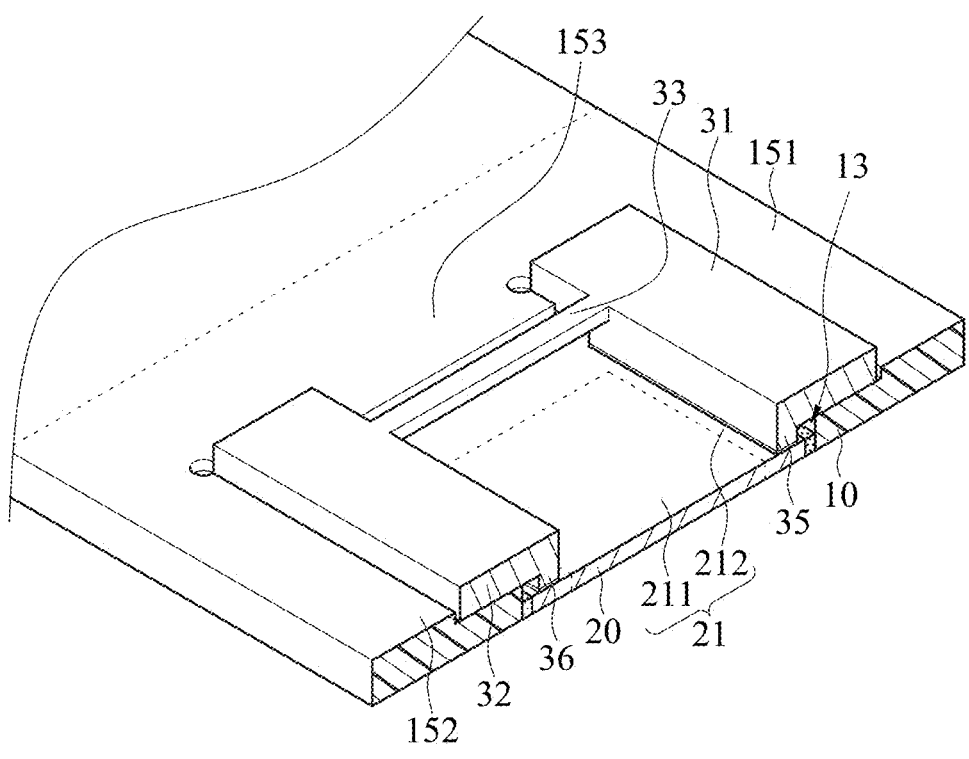
FIG. 12 illustrates a cross-sectional view of a camera device according to a fifth embodiment of the instant disclosure.

FIG. 12 illustrates a cross-sectional view of a camera device according to a fifth embodiment of the instant disclosure. As shown in FIG. 12, the difference between the fifth embodiment and the fourth embodiment is at least that, in this embodiment, the first connection arm 33 of the reinforcement member 30 is spaced apart from the photosensitive element 20, and the reinforcement member 30 is merely fixed to the surface of the non-photosensitive element 20 through the first extension portion 35 and the second extension portion 36.

In some embodiments, the reinforcement member 30 may have an anti-reflective surface to prevent the external light from being reflected by the reinforcement member 30 after the external light enter the base 51 from the lens 55 to affect the photosensitive performance of the photosensitive element 20. For example, the reinforcement member 30 may be made of a dark-colored material (e.g., the dark-colored material may be a black plastic material, a black resin material, a black metal material, or the like), so that the reinforcement member 30 can absorb light and perform anti-reflection effect. Alternatively, in some embodiments, the surface of the reinforcement member 30 may be provided with an anti-reflection coating or micro structures to achieve the anti-reflection effect.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A camera device comprising:
   a circuit board having an assembling hole, a first surface, and a second surface opposite to the first surface, wherein the assembling hole penetrates the first surface and the second surface, the assembling hole has an inner annular surface, and a periphery of the assembling hole is formed as a surrounding portion; the surrounding portion includes a first side wall, a second side wall, a third side wall, and a fourth side wall connected to one another,
   the first side wall and the second side wall are at opposite sides, and the third side wall and the fourth side wall are at opposite sides;
   a photosensitive element in the assembling hole, wherein the photosensitive element has a front surface, a back surface, and an outer peripheral portion, the outer peripheral portion is connected between the front surface and the back surface, and the outer peripheral portion is fixed to the inner annular surface of the assembling hole; and
   a reinforcement member disposed on the first surface, wherein the reinforcement member comprises a first plate member and a second plate member, the first plate member is fixed to the first side wall, and the second plate member is fixed to the second side wall;
   wherein the reinforcement member comprises a first extension portion and a second extension portion, the first extension portion extends from the first plate member and is in the assembling hole, and the second extension portion extends from the second plate member and is in the assembling hole;
   wherein the front surface of the photosensitive element has a photosensitive region and a non-photosensitive region, the non-photosensitive region is around the photosensitive region, and the first extension portion and the second extension portion are fixed to a surface of the non-photosensitive region of the photosensitive element.

2. The camera device according to claim 1, wherein the reinforcement member comprises a first connection arm and a second connection arm, the first connection arm and the second connection arm are connected between the first plate member and the second plate member, and the first connection arm and the second connection arm are respectively adjacent to two opposite ends of the first plate member.

3. The camera device according to claim 2, wherein the first connection arm and the second connection arm are disposed at the non-photosensitive region.

4. The camera device according to claim 1, wherein the first surface of the circuit board has a first electrical connection portion and a second electrical connection portion, and the first electrical connection portion and the second electrical connection portion are respectively on the third side wall and the fourth side wall.

5. The camera device according to claim 1, wherein the first side wall has a first limiting groove, the second side wall has a second limiting groove, the first plate member is limited in the first limiting groove, and the second plate member is limited in the second limiting groove.

6. The camera device according to claim 5, wherein the first surface of the circuit board has a first adhesive guiding hole and a second adhesive guiding hole, and the first adhesive guiding hole and the second adhesive guiding hole are respectively in communication with the first limiting groove and the second limiting groove.

7. The camera device according to claim 5, further comprising a filter, wherein the first plate member has a first recess, the second plate member has a second recess, the filter is covered on the photosensitive element, and two sides of the filter are respectively limited in the first recess and the second recess.

8. The camera device according to claim 1, further comprising a lens assembly, wherein the lens assembly is disposed on the first surface and covers the assembling hole, the lens assembly comprises a base and a lens, the lens is disposed on the base, and the position of the lens corresponds to the position of the photosensitive element; the base has a bottom, the bottom comprises a cover plate, a first side plate, and a second side plate, the first side plate and the second side plate are respectively connected to two opposite sides of the cover plate, so that two notches are formed between the first side plate and the second side plate, the first side plate and the second side plate are fixed to the first surface of the circuit board, and the first plate member and the second plate member are respectively in the two notches.

9. The camera device according to claim 8, wherein a light-shielding adhesive layer is further filled in each of the notches, and the light-shielding adhesive layer is adhered to the reinforcement member and the first surface of the circuit board.

10. The camera device according to claim 1, further comprising a lens assembly, wherein the lens assembly is disposed on the first surface and covers the assembling hole, the lens assembly comprises a base and a lens, the lens is disposed on the base, and the position of the lens corresponds to the position of the photosensitive element; the base has an annular bottom, the annular bottom is enclosed to form an internal space, the annular bottom is fixed to the first surface of the circuit board, and the reinforcement member is in the internal space.

11. The camera device according to claim 1, wherein the thickness of the photosensitive element is less than the thickness of the circuit board, the photosensitive element is adjacent to the second surface, the reinforcement member comprises a plurality of limiting blocks, the limiting blocks extend and enter the assembling hole, and the limiting blocks are respectively adjacent to four corners of the assembling hole.

\* \* \* \* \*